Patented May 3, 1932

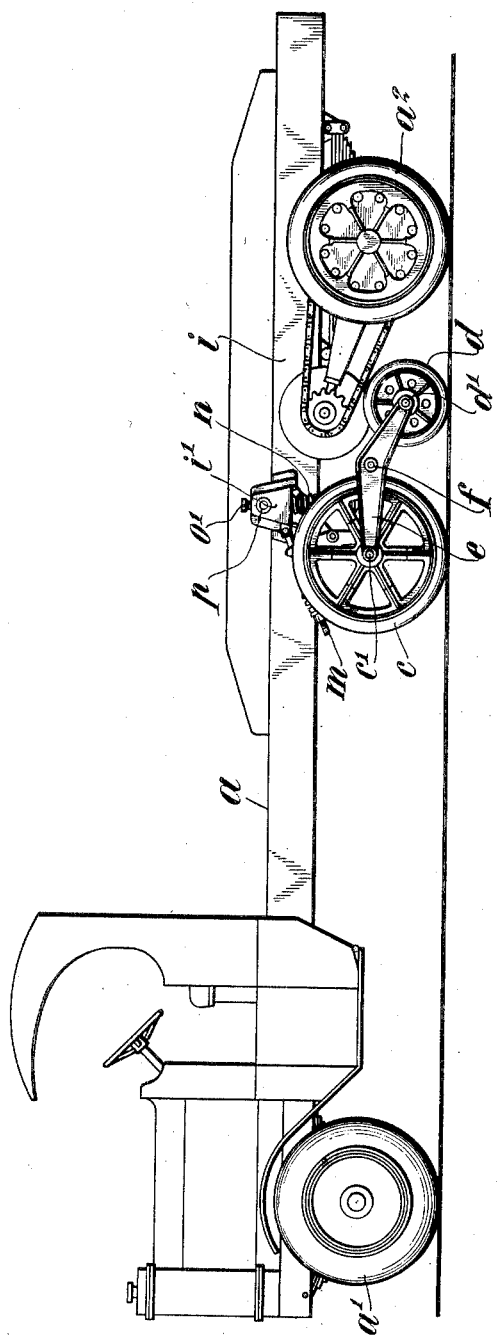

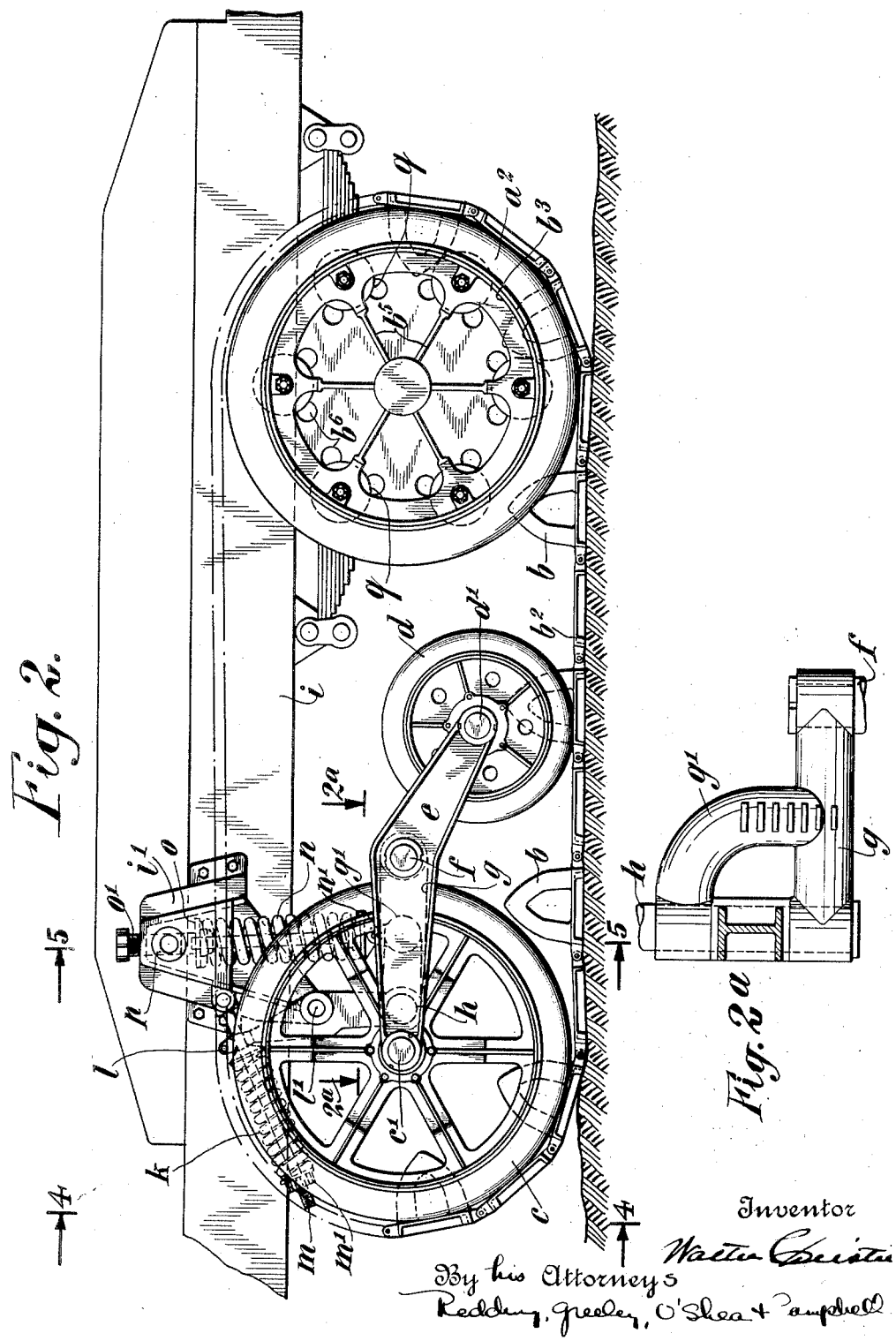

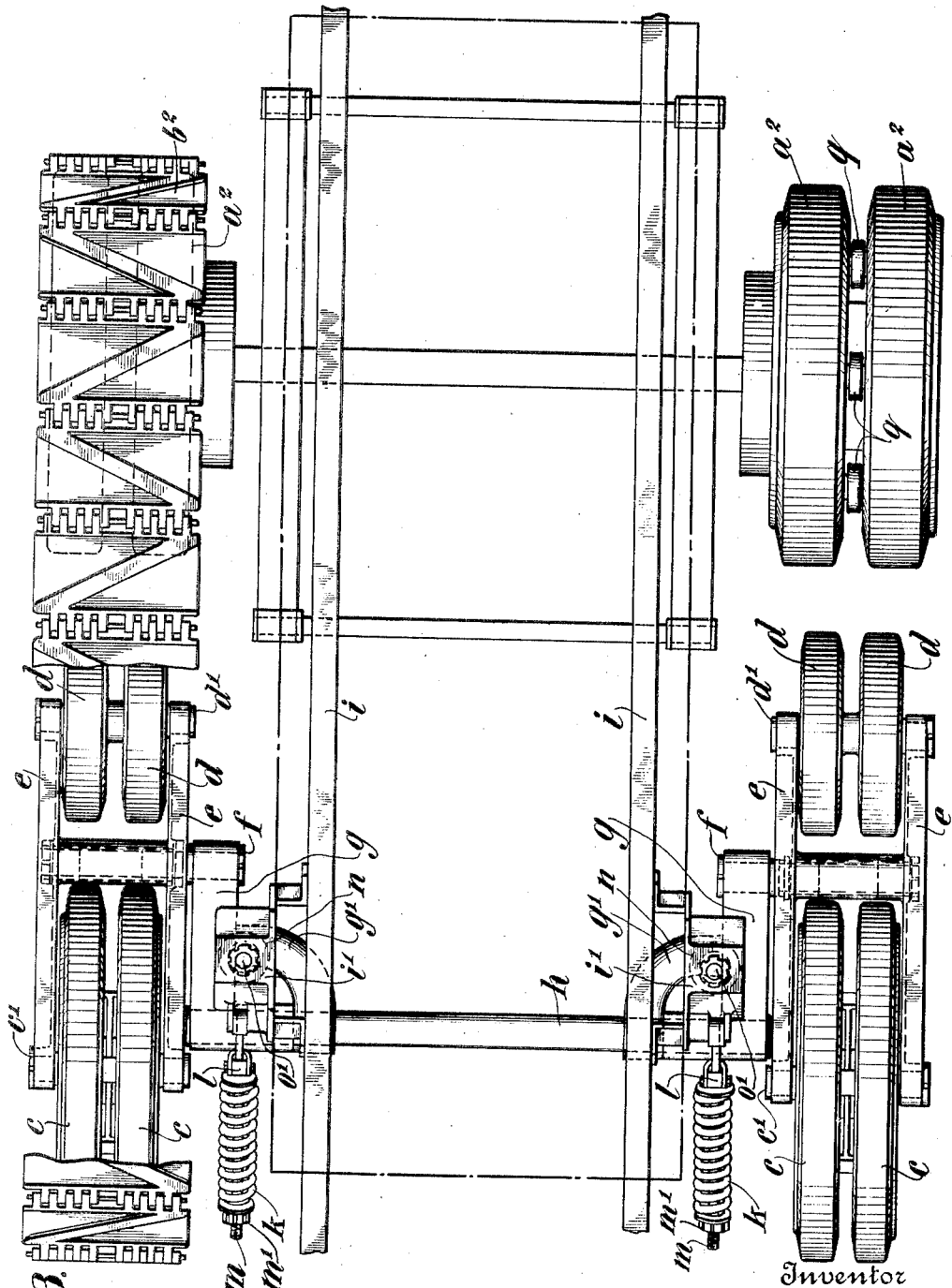

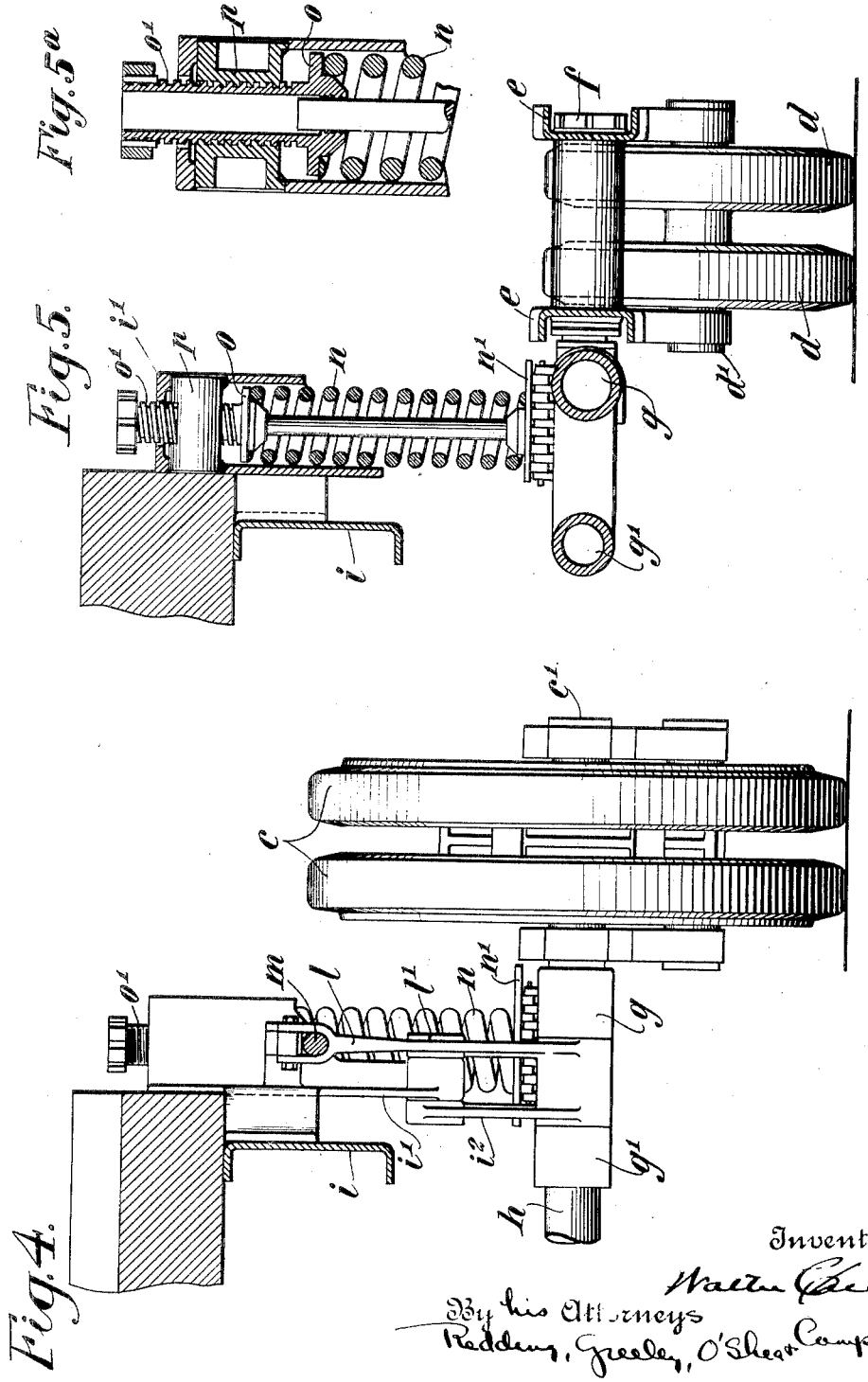

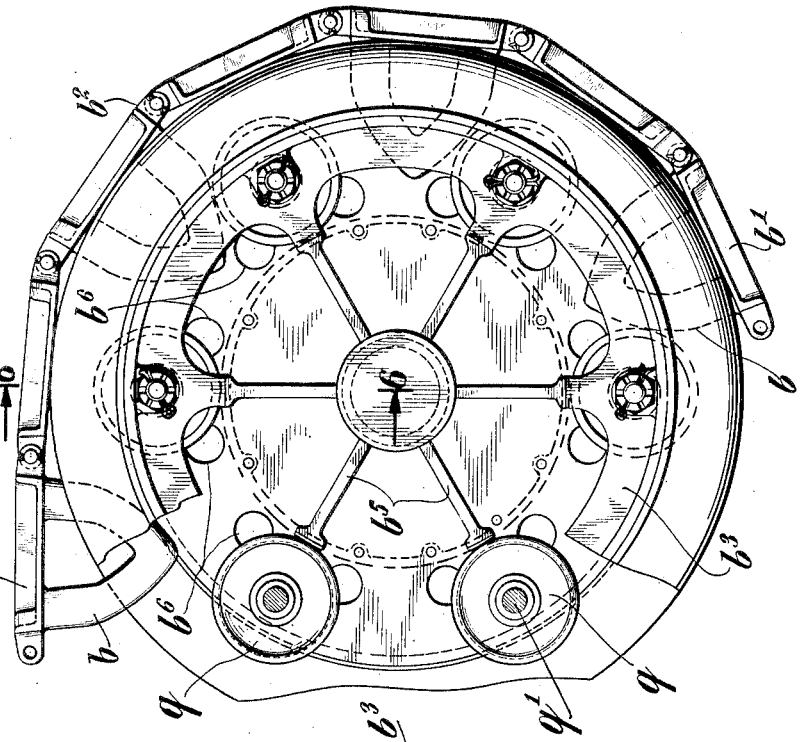
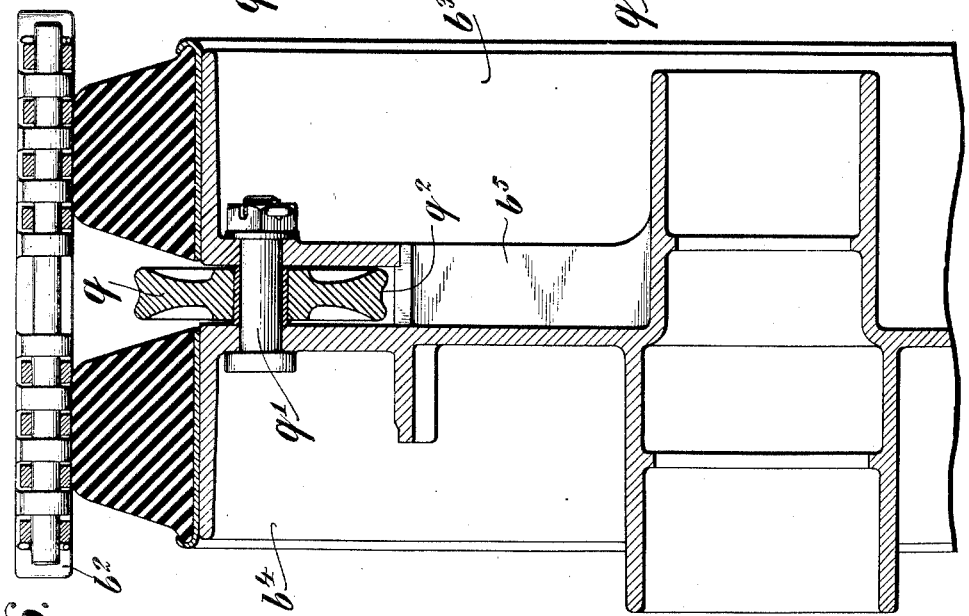

1,856,068

UNITED STATES PATENT OFFICE

WALTER CHRISTIE, OF AVON, NEW JERSEY, ASSIGNOR TO CHARLES R. LORD AND CLAYTON FARRIS, BOTH OF NEWARK, NEW JERSEY

CONVERTIBLE WHEELED TRUCK TRACTOR

Application filed April 30, 1928, Serial No. 274,097. Renewed September 19, 1931.

This invention relates to improvements in so-called "crawler" attachments for road vehicles of the general type disclosed in the claim in the copending application of the present applicant, Ser. No. 688,638, filed February 26, 1924. In accordance with the system disclosed therein, road wheels are provided around which may be placed tracks of the track laying type to facilitate operation over difficult terrain. In either event it is proposed to transmit the load of the vehicle to the ground through more than one pair of wheels. It is further proposed that the load shall be sprung as to all of the load carrying wheels and special provision is necessary to maintain the track centers yieldingly under all conditions of operation while cushioning the load shocks. In accordance with the present invention, certain improvements in the suspension of the additional wheels and their function are contemplated and also an improvement in the method of driving the track when applied. More particularly, it is proposed, in accordance with the improvements, to provide bogeys at opposite sides of the vehicle, each bogey comprising a wheel of large diameter over which the track passes and a wheel of small diameter which further distributes the load and insures a more efficient track action. Each bogey is pivoted at a point between the large and small wheels on a stub axle about which the bogey may rock, while the stub axle itself has an arcuate movement about the supporting dead axle which extends transversely of the vehicle frame, this dead axle itself being pivotally suspended from the frame, so that the greatest degree of compensation and the most effective load distribution is further assured by the resulting combined motions of all of the parts. The springing of the load as to the bogeys is accomplished by means of substantially vertically disposed springs engaging the supporting arms for the bogeys at points between their axes and the axis of the supporting axle. Resistance to strains tending to change the track centers is offered yieldingly by the independent springs which are so disposed with respect to the supporting dead axle itself as to effectively apply their force to the dead axle at all times and resist yieldingly a shortening of the track centers. While the two sets of springs referred to are physically independent and are primarily adapted to perform independent functions, there is an interrelation between them functionally by which the most efficient performance of their duties is jointly accomplished.

The driving of the track more efficiently is secured, in accordance with the present invention, by forming certain of the links thereof with inwardly depending lugs which are engaged by rollers revolubly carried with the drive wheel, the engaging surfaces of the rollers and lugs being complementary. The principal advantages secured by this method of drive is the reduction of friction and power losses and a self-scavaging sprocket.

These and other objects and advantages will appear at greater length hereinafter in connection with the detailed description of the embodiment illustrated in the accompanying drawings wherein:

Figure 1 is a view in side elevation of a road vehicle showing the improved attachment with the track omitted.

Figure 2 is a view in side elevation on a somewhat larger scale showing the operating parts of the vehicle illustrated in Figure 1, so far as they involve the present improvements.

Figure 2$^a$ is a detailed view partly in plan and partly in horizontal section showing the pivoted suspension arm for the stub axle of the bogey and taken on the plane indicated by line 2$^a$—2$^a$ of Figure 2.

Figure 3 is a plan view thereof with a track indicated as applied at one side of the vehicle and removed at the other side.

Figure 4 is a detailed fragmentary view in transverse section showing one of the idler wheels and the method of supporting the bogeys and taken on the plane indicated by line 4—4 of Figure 2.

Figure 5 is a detailed sectional view taken transversely through the parts shown in Figure 4 illustrating the relation of the suspension spring to the bogey and taken on the plane indicated by line 5—5 of Figure 2.

Figure 5$^a$ is a detailed view in section of the means for adjusting the tension of the suspension spring.

Figure 6 is a fragmentary, sectional view through one of the drive wheels showing the relation of the track thereto and the improved drive roller and taken on the plane indicated by line 6—6 of Figure 7, looking in the direction of the arrows.

Figure 7 is a fragmentary, detailed view in side elevation showing the improved drive for the track.

As shown in Figure 1, the vehicle $a$ will be provided with front steering road wheels $a'$ and driving wheels $a^2$. These driving wheels, as shown in Figure 3, are of a dual character, being spaced to receive lugs $b$ formed to depend from links $b'$ of a track $b^2$ which may be applied to the drive wheels and to cooperating idler road wheels $c$, whenever the character of the terrain makes that advisable. When the tracks are not applied, the vehicle, as a road vehicle, has all of the advantages which flow from application of the load to the road at a relatively great number of points. In the vehicle illustrated, the load is thus transmitted to the road through four wheels at each side of the vehicle, small idler wheels $d$ being operatively associated with the larger idler wheels $c$ in a manner which constitutes one of the principal improvements. Since parts are duplicated at opposite sides of the vehicle, the description of those at one side only will be sufficient. The wheels $c$ and $d$ are journalled respectively at $c'$ and $d'$ in spaced frame members $e$, the whole, when assembled, constituting what will be hereinafter termed for convenience, a bogey. Through the bogey passes a stub axle $f$ about which the frame members $e$ may rock, permitting automatically at all times an interaction between the wheels $c$ and $d$ by which they may mutually accommodate themselves to operating conditions. The stub axle $f$ is journalled in a frame, the form of which is best illustrated in Figure 2$^a$. This frame includes a longitudinally extending member $g$ and an arm $g'$ secured thereto at its mid-section but curved in the plan so as to form with the main section $g$ a yoke. This yoke is pivoted on a dead axle $h$ which extends across the vehicle. The dead axle $h$ is pivotally hung from the side frame members $i$ through a bracket $i'$ secured thereto and a pivoted hanger $i^2$ attached to the bracket, as will be clear from Figure 4. Swinging of the hanger $i^2$ is opposed by a coil spring $k$ the relation of which to the hanger is shown in Figure 2. The coil spring $k$ bears against the free end of a bell crank lever $l$ which is pivoted intermediate its ends at $l'$ to the bracket $i'$ and has its lower end integral with or otherwise secured to the hanger. The rod $m$ passes through the spring $k$ and is attached pivotally at one end to the bracket $i'$ and has at its other end a nut $m'$ threaded thereon for adjustment of the tension of the spring in a manner which will be obvious. The disposition of the spring $k$ with respect to the bell crank lever $l$ is such that, taking into account the direction of the forces, its energy is most efficiently applied to the lower end of the bell crank to urge the dead axle $h$ and the large idler wheel $c$ away from the driving wheels $a^2$. Thus the distance between their centers is maintained yieldingly at all times and the parts relieved of undue positive pulls and the load itself somewhat cushioned. However, the present improvements provide separate springs for suspending the load on the bogeys, such a spring being illustrated at $n$ and being interposed operatively between the chassis frame and the bogey. More particularly, as illustrated in Figures 2 and 5, a spring $n$ is formed as a coil spring seated at its lower end on a plate $n'$ which is pivotally attached to the yoke $g$ to permit self-alignment of the spring under angular movements of the yoke. The upper end of the spring is seated on a flange $o$ carried with a screw $o'$ which is threaded diametrically through a cylindrical nut $p$ journalled in the bracket $i'$ to rock on a horizontal axis to accommodate the aforesaid self-aligning of the spring. The worm $o'$ may be threaded in or out of the nut $p$ to adjust the tension of the spring $n$, as will be apparent. The load of the vehicle is transmitted through the spring $n$ to the yoke $g$ which, as has been before pointed out, is pivotally supported on the bogey. The other end of the yoke is carried with the dead axle $h$ which is so disposed with respect to the other parts as to be yieldingly maintained for the most part directly beneath the point of pivotal attachment of the hanger $i^2$ to the bracket $i'$. Displacement of the tubular axle from this relationship is resisted by the spring $k$ which may momentarily from time to time take a component of the load.

The assembly described is such that the axles $c'$, $d'$ of the wheels $c$, $d$ may move about the stub axle $f$; the stub axle $f$ may move about the dead axle $h$; and the dead axle $h$ may swing about the point of pivotal attachment of the hanger $i^2$ on the bracket $i'$. These movements in greater or less extent will result from different conditions of operation and the combining of the movements will give the most efficient action free to a great extent from injurious shocks. The springs $k$ and $n$ are constantly in action to restrain these movements to a desired degree.

Referring now to the improved form of drive illustrated in Figures 6 and 7, it will be seen that the track $b^2$ is made up of a plurality of pivoted links $b'$, every other one of which, in the illustrated embodiment, has a depending lug $b$. The lugs $b$ guide the track in its movement over the dual wheels $c$ and $a^2$. The fellies $b^3$ and $b^4$ of the driving wheel $b^2$ are spaced to receive therebetween a plurality of rollers $q$ journalled revolubly on bolts $q'$, respectively, which may serve to secure the felly members together. As shown, each roller has a concave periphery $q^2$, which is adapted to engage the driving edge of the lugs $b$, which is convex in form to insure the most satisfactory interaction with the periphery of the roller. It will be evident, however, that each roller may be flat on its periphery in which case the driving edges of the lugs will, similarly, be flat. Since the rollers may revolve, their engagement with the lugs may be maintained without surface friction, a rolling contact being provided. This results in a more efficient drive with minimum loss of power. Further, the wheel construction itself insures free scavaging, since the space between the rollers is open and their constant rotation will serve to discharge material. Radial spokes $b^5$, which support the felly $b^3$, are so related to the parts as not to interfere with this action and the web of the other felly $b^4$ may have openings $b^6$ therethrough adjacent the periphery of the rollers to further the discharge of material.

Changes in the matter of design, material and relative disposition of parts may be made without departing from the spirit of the invention, so long as the results indicated herein are obtained by elements responding to the appended claims.

What I claim is:

1. In a convertible road vehicle having steering wheels, in combination, a load wheel on each side of the vehicle, two additional load wheels on each side of the vehicle and mounted independently of the first load wheels, a rigid frame in which the two last named wheels at each side of the vehicle are journaled, means to connect said frame pivotally with the frame of the vehicle, and springs operatively interposed between the two frames to resist yieldingly relative displacement therebetween.

2. A vehicle having a load wheel, an additional load wheel, a dead axle carried with the vehicle frame, means to mount the additional wheel on said axle, a spring between the frame of the vehicle and said dead axle to resist yieldingly displacement of the axle with respect to said frame, and a spring between the mounting means and the frame.

3. A vehicle having a load wheel, an additional independently mounted load wheel, a dead axle carried with the vehicle frame, an arm carried with the dead axle on which said additional load wheel is mounted, whereby the additional load wheel may have an arcuate movement about said dead axle, a spring operatively interposed between said arm and the frame of the vehicle to resist said arcuate movement, and a spring between the frame of the vehicle and the dead axle.

4. A vehicle having a load wheel, an additional load wheel, an arm upon which said last named wheel is mounted, a lever journaled on the frame, a dead axle mounted on the lever, means to journal the arm on the dead axle, whereby the last named wheel may have an arcuate movement about said dead axle, a spring operatively interposed between the arm and the frame of the vehicle to resist said arcuate movement, and an independent spring between the lever and the frame to resist yieldingly movements of the dead axle toward the first named load wheel.

5. A vehicle having a load wheel, an additional independently mounted load wheel, an arm upon which said last named wheel is mounted, a dead axle carried with the vehicle frame, means to pivotally suspend the dead axle from the frame of the vehicle, means to journal the arm upon the dead axle, a spring interposed overatively between the frame of the vehicle and the dead axle, suspending means to resist yieldingly movements thereof, and a spring between the arm and the frame.

6. A vehicle having a load wheel, a dead axle pivotally suspended from the frame of the vehicle independently of the load wheel, an arm pivotally mounted on the dead axle and carrying at its free end a stub axle, a bogey frame pivoted on said stub axle, wheels journaled in the bogey frame at opposite sides of the stub axle, spring means operatively interposed between the frame of the vehicle and the bogey to resist yieldingly displacement of the bogey with respect to the frame, and a spring between the dead axle and the frame.

7. A vehicle having a load wheel, a dead axle pivotally suspended from the frame of the vehicle independently of the load wheel, an arm pivotally mounted on the dead axle and carrying on its free end a stud axle, a bogey frame pivoted on said stub axle, wheels journalled in the bogey frame at opposite sides of the stub axle, a lever pivoted on the frame and engaged with the dead axle and a spring operatively engaging the said lever to urge the dead axle yieldingly away from the first named load wheel.

8. A vehicle having a load wheel, a dead axle pivotally suspended from the frame of the vehicle, an arm pivotally mounted on the dead axle and carrying at its free end a stub axle, a bogey frame pivoted on said stub axle, wheels journalled in the bogey frame at opposite sides of the stub axle, a lever pivoted on the frame and engaged with the dead axle, a spring operatively engaging the said lever to urge the dead axle yieldingly away from the first named load wheel and a spring operatively interposed between the said arm and the frame of the vehicle to cushion the load.

9. A vehicle having a load wheel, a dead axle pivotally suspended from the frame of the vehicle, an arm pivotally mounted on the dead axle and carrying at its free end a stub axle, a bogey frame pivoted on said stub axle, wheels journalled in the bogey frame at opposite sides of the stub axle, a lever pivoted on the frame and engaged with the dead axle, a spring operatively engaging the said lever to urge the dead axle yieldingly away from the first named load wheel, a spring operatively interposed between the said arm and the frame of the vehicle to cushion the load and means to adjust the tension of said springs.

This specification signed this 5th day of April A. D. 1928.

WALTER CHRISTIE.